Patented Nov. 9, 1948

2,453,264

UNITED STATES PATENT OFFICE 2,453,264

CELLULOSE ESTER OR ETHER PLASTICIZED WITH ETHYL ALPHA-CARBETHOXYETH-OXYETHYL CARBONATE

Chessie E. Rehberg, Glenside, Pa., assignor to United States of America as represented by the Secretary of Agriculture No Drawing. Original application September 28, 1944, Serial No. 556,241. Divided and this application November 7, 1945, Serial No. 627,269

3 Claims. (Cl. 106—182)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This is a division of my abandoned application Serial No. 556,241, filed September 28, 1944.

This invention relates to cellulose esters or ethers plasticized with esters of hydroxy acids wherein the hydroxyl group of the hydroxyester is acylated with an alkyl, alkenyl or alkoxyalkyl carbonic acid, which may be represented by the formula

ROCOOCR'R''COOR''' wherein R and R''' are alkyl, alkenyl or alkoxyalkyl radicals and R' and R'' are each hydrogen or alkyl radicals, and are conveniently prepared by treating an ester of a hydroxy carboxylic acid with an alkyl, alkenyl or alkoxyalkyl chlorocarbonate (sometimes referred to as a chloroformate) in accordance with the equation ROCOCl + HOCR'R''COOR''' →
ROCOOCR'R''COOR''' + HCl The esters of this invention are typically clear, colorless, mobile liquids having low vapor pressure at ordinary temperatures and, because of their low volatility and good compatibility, are useful as plasticizers and solvents for many resinous materials. Those esters containing one or more reactive olefinic double bonds are also useful when polymerized alone or with other polymerizable materials, particularly with the acrylic or vinyl type of monomer.

The following examples illustrate my invention and the manner in which it may be practiced:

EXAMPLE I

General procedure

One mole of the alkyl ester of a hydroxy acid is mixed with 1.1 moles of pyridine or other tertiary amine and the mixture is cooled and stirred while 1.1 moles of the alkyl chlorocarbonate is slowly added, the temperature of the mixture being kept below 40° C. When the mixing is complete, the mixture is slowly heated to 100° C., at which temperature it is maintained for 1–5 hours. After cooling, the material is washed twice with cold water, then once with dilute hydrochloric acid, and again with water, then dried and distilled. A small additional amount of product can be recovered by extracting the washings with benzene or ether and combining the extracts with the main product. Saturated brine may be used instead of water in washing those products which show appreciable solubility in water. Because of the very low vapor pressure of most of the compounds covered by this invention, it is advisable to distill them under reduced pressure.

Table 1, below, contains a list of compounds prepared in accordance with this invention and data relative to yields and physical properties.

TABLE 1

*Alkyl alpha-carbalkoxyalkyl carbonates*

| R | R' | R'' | R''' | B. P., °C. | Press., mm. Hg | $N_D^{20}$ | $d_4^{20}$ | Yield, percent |
|---|---|---|---|---|---|---|---|---|
| Methyl | Methyl | Hydrogen | Methyl | 80 | 6 | 1.4100 | 1.1587 | 58 |
| Ethyl | do | do | do | 110 | 26 | 1.4118 | 1.1134 | 53 |
| Do | do | do | n-Butyl | 136 | 18 | 1.4182 | 1.0325 | 54 |
| Do | do | do | Allyl | 129 | 23 | 1.4280 | 1.0776 | 40 |
| Do | do | do | Ethoxyethyl | 90 | 1 | 1.4229 | 1.0791 | 42 |
| n-Propyl | do | do | Methyl | 98 | 7 | 1.4163 | 1.0820 | 68 |
| i-Propyl | do | do | do | 93 | 7 | 1.4118 | 1.0734 | 35 |
| n-Butyl | do | do | do | 125 | 14 | 1.4196 | 1.0604 | 61 |
| i-Butyl | do | do | do | 115 | 12 | 1.4180 | 1.0549 | 84 |
| Allyl | do | do | Allyl | 102 | 2 | 1.4410 | 1.0790 | 64 |
| n-Amyl | Hydrogen | do | Ethyl | 114 | 2 | 1.4239 | 1.0442 | 78 |
| n-Butyl | do | do | sec.-Butyl | 110 | 1 | 1.4221 | 1.0206 | 82 |
| n-Amyl | Methyl | Methyl | Ethyl | 123 | 7 | 1.4237 | 1.0038 | 29 |
| n-Butyl | do | do | do | 124 | 21 | 1.4202 | 1.0162 | 40 |

From the examples listed in Table 1, it is apparent that a very wide variety of compounds can be prepared in accordance with this invention by varying the selection of the three essential components of the product; namely, (1) the chlorocarbonate, (2) the hydroxy carboxylic acid, and (3) the alcohol with which the hydroxy acid is esterified. Because of the wide variety of chlorocarbonates, hydroxy acids and alcohols which are available commercially or which can be readily synthesized, the number of combinations of these three components which can be used to prepare esters in accordance with this invention is very large. By proper choice of these three components, the properties of the product can be controlled over a wide range and esters having properties needed for many purposes can be produced. For example, for plasticizers, the volatility, water resistance, solubility, solvent power and other important properties can be controlled to a large extent.

A valuable property possessed by those esters which contain one or more olefinic double bonds is their ability to polymerize and to copolymerize with other polymerizable monomers.

POLYMERIZATION OF ALLYL ALPHA-CARBALLYLOXYETHYL CARBONATE

EXAMPLE II

A few milligrams of benzoyl peroxide was added to 5 cc. of the monomeric ester which was then placed in a test tube in an oven at 85° C. After standing overnight, the material had polymerized to a clear, colorless, hard and somewhat brittle resin, free from bubbles or other imperfections and easily removed from the tube without breaking. The polymer was of the insoluble, infusible, cross-linked type.

EXAMPLE III

Allyl alpha-carballyloxyethyl carbonate was added to methyl acrylate to make 1, 2, 5, and 10% solutions of the carbonate. 20 g. of these mixtures was added to 80 cc. of ethyl acetate containing 0.05 g. of benzoyl peroxide and the solutions thus obtained were placed in flasks in a water bath maintained at 75° C. After 24 hours, all the samples had polymerized, those containing 1 and 2%, respectively, of allyl alpha-carballyloxyethyl carbonate giving sirupy solutions, that containing 5% giving a ropy, partially gelled solution, and that containing 10% giving a solid gel. Similar samples, using 5 and 10% of the carbonate, but with 0.5% of dodecyl mercaptan added to each, gave sirupy solutions with no trace of gelation.

Sheets, films and other objects prepared from the solutions of polymers obtained above were clear, colorless, flexible, and elastic. Similar objects which were insoluble in the common organic solvents were produced by adding benzoyl peroxide (1–2% based on polymer content) to the polymer solutions. After removal of the solvent, the objects were heated for several hours at 80°–100° C. After this heat treatment, the resin was no longer soluble in common organic solvents.

CELLULOSE DERIVATIVES PLASTICIZED WITH ALKYL ALPHA-CARBALKOXYALKYL CARBONATES

EXAMPLE IV

Two series of tests were made using the same group of plasticizers, one on cellulose acetate and the other on ethyl cellulose.

In the first series, a mixture of 5 parts of cellulose acetate (acetone-soluble, high-medium viscosity, low acetyl) and 1 part of plasticizer was dissolved in 60 parts of a 10:1 acetone-methanol mixture. The solution was poured into a flat dish and the solvent allowed to evaporate. Finally, the film was cured by heating 24 hours at 85° C. The film was then examined for compatibility, brittleness, flexibility, and so forth.

In the other series, the same technique was used, except that equal parts of ethyl cellulose and plasticizer were dissolved in pure acetone.

The results of these tests are listed in the following table:

TABLE 2

| No. | Plasticizer | Cellulose Acetate Series | Ethyl Cellulose Series |
|---|---|---|---|
| 1 | Methyl Alpha-Carbomethoxyethyl Carbonate | clear, tough, flexible | clear, tough, flexible. |
| 2 | Ethyl Alpha-Carbethoxyethoxyethyl Carbonate | do | Do. |
| 3 | Ethyl Alpha-Carballyloxyethyl Carbonate | do | Do. |
| 4 | Allyl Alpha-Carballyloxyethyl Carbonate | clear, slightly brittle | clear, slightly brittle. |
| 5 | n-Butyl Alpha-Carbo-sec.-butoxymethyl Carbonate | incompatible | clear, tough, flexible. |
| 6 | n-Amyl Alpha-Carbethoxyisopropyl Carbonate | do | Do. |

All the plasticized compositions were completely compatible except 5 and 6 in the cellulose acetate series.

Esters having two polymerizable double bonds in the molecule can be polymerized alone or with other monomers, such as crylic esters, to produce resins which may be of the linear, soluble, thermoplastic type or of the cross-linked, insoluble type, depending on the manner in which the polymerization is carried out. Thus, a high concentration of catalyst and a high temperature favor the formation of the latter type of resin. On the other hand, by proper choice of catalyst, catalyst concentration and temperature, a soluble, thermoplastic resin may be obtained which can subsequently be converted into the insoluble type by incorporating additional catalyst and then heating, or by heat alone.

Thus, in preparing a copolymer of 99% methyl acrylate and 1% allyl alpha-carballyloxyethyl carbonate, about 1% of benzoyl peroxide may be incorporated and the polymerization effected by heating the mixture, suitably in 10–40% concentration in an organic solvent which dissolves both the monomer and the polymer, at a moderate temperature, such as 30°–80° C., until a viscous, sirupy solution of the polymer is obtained. This solution may be painted, sprayed, or otherwise used for coatings, impregnations, films, sheets, and so forth, or the solvent may be removed and the resin used for moldings.

After such fabrication, the finished product may be heated at 80°–150° C. to convert the resin to the insoluble, cross-linked type. When the percentage of the bifunctional polymerant used in the resin is low, the cured resin, in addition to being resistant to water, oils and solvents, has the valuable property of being flexible and elastic, although most other cross-linked resins are hard and brittle. This unusual property makes resins of this type particularly useful for coatings and laminations where the finished product will be subjected to bending or vibration.

Having thus described my invention, I claim:

1. A plastic composition substantially consisting of a cellulose plastic of the group consisting of cellulose esters and ethers and ethyl alpha-carbethoxyethoxy-ethyl carbonate of the formula

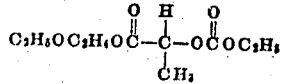

as plasticizer.

2. A plastic composition substantially consisting of cellulose acetate and ethyl alpha-carbethoxyethoxy-ethyl carbonate as plasticizer.

3. A plastic composition substantially consisting of ethyl cellulose and ethyl alpha-carbethoxyethoxy-ethyl carbonate, as plasticizer.

CHESSIE E. REHBERG.

REFERENCES CITED

The following references are of record in the file of this patent:

UNITED STATES PATENTS

| Number | Name | Date |
| --- | --- | --- |
| 2,258,870 | Thurston | Oct. 14, 1941 |
| 2,265,814 | Ritchie | Dec. 9, 1941 |
| 2,370,573 | Muskat et al. | Feb. 27, 1945 |
| 2,384,118 | Muskat et al. | Sept. 4, 1945 |
| 2,384,120 | Muskat et al. | Sept. 4, 1945 |
| 2,387,932 | Muskat et al. | Oct. 30, 1945 |
| 2,387,933 | Muskat et al. | Oct. 30, 1945 |